I. Bezenah.
Stump Extractor.
N° 92,002. Patented Jun. 29, 1869.
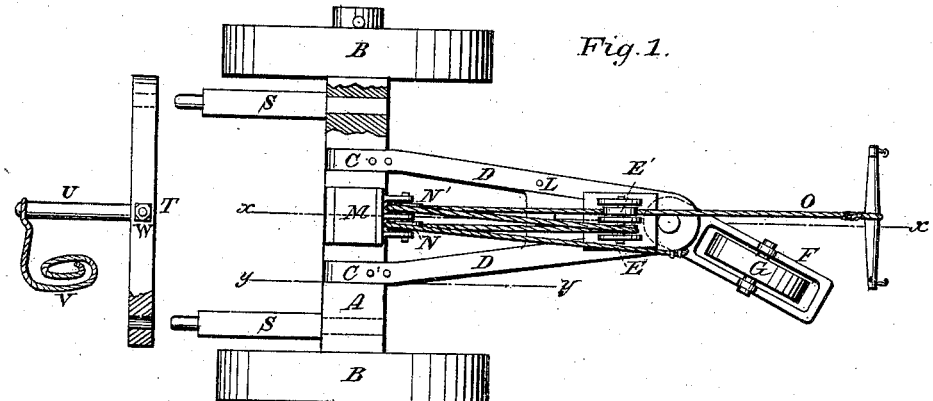
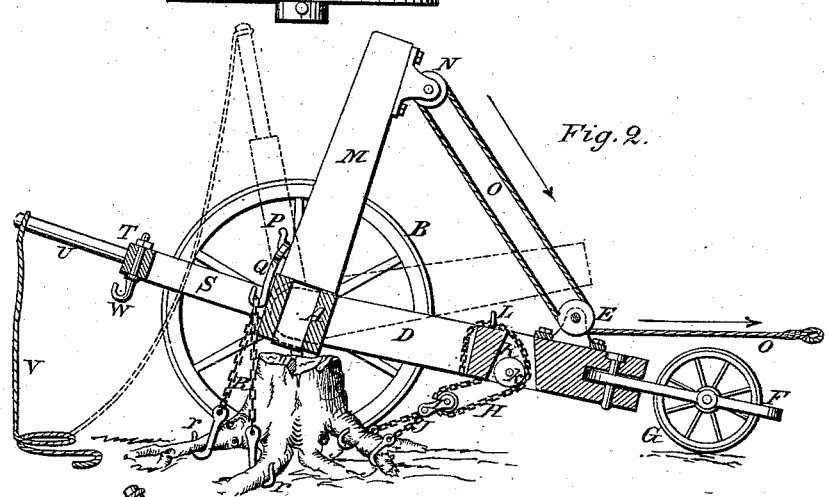
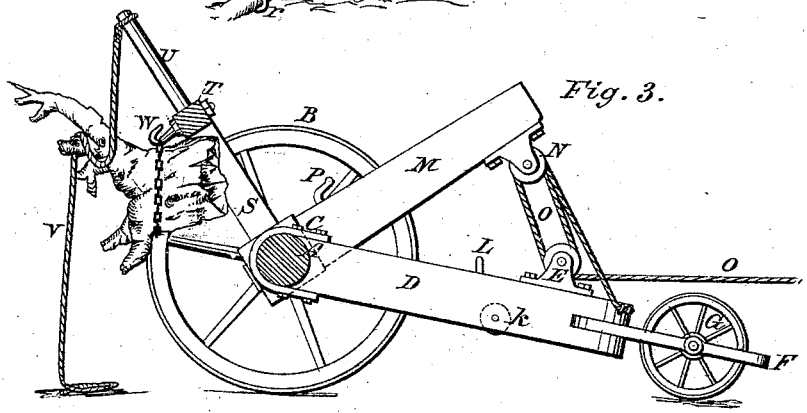
Witnesses.
J. H. Layman
Sam Knight
Inventor.
Isidore Bezenah
By Knight Bros.
Attys.

United States Patent Office.

ISIDORE BEZENAH, OF ST. MARTINS, OHIO.

Letters Patent No. 92,002, dated June 29, 1869.

IMPROVEMENT IN STUMP-EXTRACTOR.

The Schedule referred to in these Letters Patent and making part of the same.

*To whom it may concern:*

Be it known that I, ISIDORE BEZENAH, of St. Martins, Brown county, Ohio, have invented a new and useful Stump-Extractor; and I hereby declare the following to be a full, clear, and exact description thereof, reference being had to the accompanying drawings, making part of this specification.

This invention relates to a machine which is operated or moved from place to place by a single pair of horses or oxen, and which is intended to tear stumps from the ground, and raise them to a sufficient height to allow the driving of a wagon beneath them, for convenience of loading.

In the drawing—

Figure 1 is a plan view of my invention.

Figure 2 represents a vertical section on the line $x\ x$, fig. 1, and shows the machine, with its hooks, chains, &c., in proper position preparatory to extracting the stump.

Figure 3 is a vertical section on the line $y\ y$, fig. 1, showing the position of the parts in carrying the stump away, or placing it at a sufficient height for a wagon to drive underneath.

A is an axle-tree, which may be made about twelve feet in length, and upon whose ends are placed the wheels B.

The said wheels may have a radius of six feet, and a tread or breadth of rim of twelve inches, more or less.

Connected, by straps C, to the axle, is a bifurcated lever or hounds, D, at whose forward end are two pulley-blocks, E E'; or, instead of blocks, the sheaves may be inserted in the body of the lever D.

At the forward end of the lever D is a clevis-frame, F, which gives journal-bearing to a wheel, G.

To the lower side of the lever D is attached one end of a chain, H, which passes through a pulley-block, I; and through an eye in the said block is passed a chain, J, having at each end a pointed hook, $j$.

The free end of the chain H is passed through a vertical mortise, K, in the lever D, and bears upon a sheave, $k$, therein.

From the mortise, the end of the chain is laid over, and engaged upon a pin, L.

Mortised into the axle A, at its mid-length, is a lever, M, at whose outer end is a block, N, a rope, O, being rove through the blocks E, E', and N.

At the rear side of the lever M is a bent pin or hook, P, which supports a chain, Q, through the lower link of which is passed a chain, R, each end of which has a hook, $r$.

Mortised into the axle A, at right angles thereto, and to the lever M, are the two side-pieces, S, of a frame, which has a removable cross-piece or bar, T, to which is mortised a lever, U, to whose outer end may be attached a rope, V.

The cross-bar T has a hook, W, at its mid-length.

The operation of the machine is as follows:

The team is hitched to the clevis F, and the machine drawn to such a position that the stump is nearly beneath the axle. The lever M is put into an upright position. The hooks $j$ are made fast beneath the roots of the stump, and the chain H drawn taut, and engaged upon the pin L.

The hooks $r$ of the chain R are then engaged beneath one or more of the leading lateral roots, and the chain Q engaged upon the hook P.

The team, then, being unhitched from the clevis, is hitched to the cord O, and the latter drawn out through the blocks.

The forward movement of the machine, and the raising of the lever D, are prevented by the devices H I J $j$; and the stump is loosened from the ground by the downward and forward movement of the lever M, which imparts an upward motion to the chains Q and R.

If the roots of the stump are not entirely withdrawn from the ground, the lever M may be again raised, by the backward and downward movement of the lever-frame S T U, and, a fresh hold being taken on the stump, it is again raised by the means before stated.

If it is desired to elevate the stump sufficiently to allow the driving of a wagon beneath it, for the purpose of loading it thereon, the chain Q is engaged upon the hook W, when the lever M has been again drawn back, and, the raising-devices being again put in operation, the stump may be lifted as high as desired.

When using the hook W, as just stated, the chain H is let out sufficiently to bring the hook into the proper position, in relation to the stump, by allowing the machine to be moved forward.

When a tree or a stump of considerable height is to be operated upon, the cross-bar T is removed, so as to allow the machine to operate upon the same, as otherwise, in elevating the lever M, the cross-bar would come in contact with the tree.

The block E, or either or all of the blocks, may be snatch-blocks, to allow the easy and rapid removal or introduction of the rope.

I claim herein as new, and of my invention—

1. In combination with the axle A, and wheels B, the grapnel-chain J $j$, block I, chain H, blocks E E' N, lever M, and chain or chains Q R $r$, the lever or hounds D C, as and for the purpose stated.

2. In combination with the elements A B C D M, the lever-frame S T U, for the double purpose of drawing back the lever M, and of raising the loosened stump clear of the ground, as set forth.

3. The provision, in the lever-frame S T U W, of the removable portion T U W, as and for the purpose stated.

In testimony of which invention, I hereunto set my hand.

ISIDORE BEZENAH.

Witnesses:
GEO. H. KNIGHT,
JAMES H. LAYMAN.